US012630462B2

(12) United States Patent
Ellison et al.

(10) Patent No.: US 12,630,462 B2
(45) Date of Patent: May 19, 2026

(54) GLASSES FOR HIGH PERFORMANCE DISPLAYS

(71) Applicant: CORNING INCORPORATED, Corning, NY (US)

(72) Inventors: Adam James Ellison, Corning, NY (US); Ellen Anne King, Corning, NY (US); Lisa Ann Lamberson, Painted Post, NY (US); Peter Joseph Lezzi, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 208 days.

(21) Appl. No.: 18/242,623

(22) Filed: Sep. 6, 2023

(65) Prior Publication Data

US 2024/0158283 A1     May 16, 2024

Related U.S. Application Data

(62) Division of application No. 17/991,968, filed on Nov. 22, 2022, now Pat. No. 11,773,006.

(60) Provisional application No. 63/424,169, filed on Nov. 10, 2022.

(51) Int. Cl.
*C03C 3/091* (2006.01)
*C03B 1/00* (2006.01)
*C03B 17/06* (2006.01)

(52) U.S. Cl.
CPC .............. *C03C 3/091* (2013.01); *C03B 1/00* (2013.01); *C03B 17/064* (2013.01)

(58) Field of Classification Search
CPC .......................................... C03C 3/076–3/118
See application file for complete search history.

(56) References Cited

U.S. PATENT DOCUMENTS

| | | |
|---|---|---|
| 8,598,055 B2 | 12/2013 | Ellison |
| 8,853,113 B2 | 10/2014 | Koyama et al. |
| 8,932,969 B2 | 1/2015 | Koyama et al. |
| 9,150,448 B2 | 10/2015 | Ellison |
| 10,730,786 B2 | 8/2020 | Tokunaga et al. |
| 2009/0294773 A1 | 12/2009 | Ellison |
| 2013/0023400 A1 | 1/2013 | Koyama et al. |
| 2013/0029830 A1 | 1/2013 | Koyama et al. |
| 2013/0059718 A1 | 3/2013 | Koyama et al. |
| 2014/0249018 A1 | 9/2014 | Koyama et al. |

(Continued)

FOREIGN PATENT DOCUMENTS

| | | |
|---|---|---|
| CN | 1268567 C | 8/2006 |
| CN | 103080032 B | 7/2016 |

(Continued)

OTHER PUBLICATIONS

Machine translation of JP 2006-213595. Retrieved Sep. 2, 2025.*

(Continued)

*Primary Examiner* — Prashant J Khatri

(57) ABSTRACT

A method of making a glass includes batching constituents, including silica, alumina, boria, magnesia, quicklime, and strontia, where one or more of the constituents is from "dirty" raw material that includes a relatively large amount of sulfur. The method further includes melting and mixing the batch to make glass having sulfur content but free of blisters, suitable for high performance displays.

20 Claims, 4 Drawing Sheets

(56) References Cited

U.S. PATENT DOCUMENTS

| | | |
|---|---|---|
| 2014/0249019 A1 | 9/2014 | Koyama et al. |
| 2021/0024403 A1 | 1/2021 | Tokunaga et al. |
| 2021/0147290 A1 | 5/2021 | Tokunaga et al. |
| 2021/0347679 A1 | 11/2021 | Ellison et al. |

FOREIGN PATENT DOCUMENTS

| | | | | |
|---|---|---|---|---|
| CN | 103204630 B | 6/2020 | | |
| CN | 113387563 A | 9/2021 | | |
| CN | 113526865 A | 10/2021 | | |
| EP | 1878709 A1 * | 1/2008 | ............. | C03B 5/225 |
| JP | 2006213595 A * | 8/2006 | ............. | C03C 3/093 |
| JP | 3988456 B2 | 10/2007 | | |
| JP | 4904062 B2 | 3/2012 | | |
| JP | 5172044 B2 | 3/2013 | | |
| KR | 10-1351112 B1 | 1/2014 | | |
| KR | 10-1523832 B1 | 5/2015 | | |
| KR | 10-1528396 B1 | 6/2015 | | |
| TW | I570087 B | 2/2017 | | |
| TW | I597250 B | 9/2017 | | |
| TW | I654155 B | 3/2019 | | |
| WO | 2011/106605 A2 | 9/2011 | | |
| WO | 2019/233290 A1 | 12/2019 | | |
| WO | 2020/078375 A1 | 4/2020 | | |

OTHER PUBLICATIONS

International Search Report and Written Opinion of the International Searching Authority; PCT/US2023/036665; dated Feb. 29, 2024; 14 pages; European Patent Office.

Lottes et al., "Glass Furnace Model (GFM) development and technology transfer program final report", Argonne National Lab. (ANL), Publication date: Dec. 4, 2007, inner pp. 1-100.

CN-113387563-A Clarivate Analytics—Performed May 12, 2023. (Year: 2023).

CN113526865A EPO Machine Translation Performed Apr. 17, 2023. (Year: 2023).

Lottes et al., "Glass Furnace Model (GFM) Development and Technology Transfer Program Final Report", Argonne National Laboratory, Nov. 9, 2007, 106 pages. (Year: 2007).

* cited by examiner

110

310

314

312

H

W

T

410

GLASSES FOR HIGH PERFORMANCE DISPLAYS

CROSS-REFERENCE TO RELATED APPLICATIONS

This application is a division of U.S. application Ser. No. 17/991,968 filed Nov. 22, 2022, which claims the benefit of priority to U.S. Provisional Application No. 63/424,169 filed Nov. 10, 2022, which is incorporated by reference herein in its entirety.

BACKGROUND

Aspects of the present disclosure relate to glasses for use with displays, such as glasses that overlay television screens and computer monitors, and manufacturing thereof.

Glasses used for modern displays, such as so-called ultra-high definition displays or "8K" displays, are generally of very high quality in terms of optical properties and dimensions. Further, such glasses maintain their geometry while undergoing temperatures associated with manufacturing of display devices. Sheets of glass made for these displays may be rejected if there are defects in the glass, such as small bubbles trapped in the glass called "blisters." Glass manufacturers have developed tools and understanding to make such glass sheets without blisters, however such tools do not come without cost.

For example, conventional wisdom is that sulfur content of glass batch constituents, especially for alkali-free glasses for high-performance displays, needs to be carefully controlled, i.e. minimized or avoided altogether to prevent blisters. Sulfur and oxides thereof (e.g., $SO_2$, $SO_3$) may react with constituents during manufacturing and/or come out of suspension within a glass melt, for example, causing blisters. To control sulfur content, Applicants have used special raw materials processed to have or otherwise having very low or zero sulfur content.

However, processing or otherwise procuring such specialized raw materials consumes energy and resources. A need exists for more efficient glasses and glass manufacturing that overcome some or all of these challenges.

SUMMARY

Applicants discovered that a certain subset of "alkali-free" glasses, suitable for high performance displays, may be manufactured with relatively large amounts of sulfur, without resulting in excess blisters. Further, the sulfur actually helps with melt kinetics of such glasses and reduces need for fining agents, such as nitrates. And better still, this sulfur may be found as an impurity in certain low-grade or "dirty" raw materials, allowing for use of less-processed raw materials, thus saving energy and labor when manufacturing such glasses.

According to an aspect of the present disclosure a method of making a glass article (e.g., sheet) includes batching constituents, including silica, alumina, boria, magnesia, calcium oxide, and strontia, where one or more of the constituents is from "dirty" raw material that includes greater than 100 ppm sulfur (e.g., greater than 1000 ppm even). Notably the glass is free or mostly free of baria, which may be counterintuitive for those of skill in the art because of perceived benefits of baria on glass liquidus. The method further includes melting and mixing the batch to make glass having sulfur content but free of blisters, suitable for high performance displays. During manufacturing of glass with the above combination of constituents in ranges as further specified herein, Applicants discovered that additionally heating a crown of a glass furnace used in the manufacturing of the glass further facilitates sulfur outgassing from molten glass. Thus, the exciting discovery includes a combination of glass compositional choices, raw material selection, and process innovations.

According to an aspect A1 of the present disclosure a method of making a glass sheet includes batching constituents including 64 to 69 mol % $SiO_2$, 11 to 13 mol % $Al_2O_3$, 6 to 8 mol % $B_2O_3$, 2 to 6 mol % MgO, 3 to 8 mol % CaO, and 1 to 6 mol % SrO, where the SrO is from a "dirty" $SrCO_3$ raw material that comprises greater than 200 ppm $SO_2$, such as greater than 1000 ppm, which is included in the batch. The method further includes melting and mixing the batch to make the glass in a molten state, and then forming the molten glass into a sheet, such as by fusion draw, float, rolling, molding, or other forming processes. According to an aspect A2, the method of aspect A1 further includes outgassing most of the sulfur from the molten glass. According to an aspect A3, the outgassing of the method of aspect A2 further includes heating a crown of a melting furnace within which the batch is molten. According to an aspect A4, the heating of the aspect A3 includes providing greater than 0.5 kJ of heat per kg of the molten glass to the crown.

According to an aspect A5 of the present disclosure, the aspect A2 further includes forming the molten glass into a sheet and cooling the molten glass, where the cooled glass comprises sulfur. According to an aspect A6, cooled glass of aspect A5 includes greater than 10 parts per million (ppm) of sulfur. According to an aspect A7, cooled glass of aspect A5 includes greater than 25 parts per million (ppm) of sulfur. According to an aspect A8, the cooled glass of aspect A7 is free of blisters having a cross-sectional dimension greater than 30 μm.

According to an aspect A9 of the present disclosure, the dirty $SrCO_3$ raw material of aspect A1 includes greater than 1500 ppm sulfur. According to an aspect A10, the constituents of the batching of aspect A9 include less than 3 mol % of nitrates.

According to an aspect A11 of the present disclosure, the dirty $SrCO_3$ raw material of aspect A1 includes greater than 3000 ppm sulfur. According to an aspect A10, the constituents of the batching of aspect A9, A10, or A11 include less than 0.25 mol % of alkali metal oxides, in combination, and less than 0.5 mol % of baria.

According to an aspect B1 of the present disclosure, a sheet of glass for a high-performance display has a thickness greater than or equal to 200 μm and less than or equal to 2 mm, a width greater than or equal to 5 cm and less than or equal to 5 m, and a height greater than or equal to 5 cm and less than or equal to 5 m. The sheet of glass includes a composition, as analyzed in mole percent on an oxide basis, including 64 to 69 mol % $SiO_2$, 11 to 13 mol % $Al_2O_3$, 6 to 8 mol % $B_2O_3$, 2 to 6 mol % MgO, 3 to 8 mol % CaO, and 1 to 6 mol % SrO. Further, the composition of the sheet, as-analyzed, includes sulfur. According to an aspect B2, the composition of the sheet of aspect B1 includes greater than 10 ppm of sulfur. According to an aspect B3, the composition of the sheet of aspect B1 includes greater than 25 ppm of sulfur. According to an aspect B4, the composition of aspect B1, B2, or B3 includes less than 0.25 mol % of alkali metal oxides, in combination. According to an aspect B5, the composition of aspect B4 includes less than 0.5 mol % of baria.

According to an aspect C1 of the present disclosure, a glass, as analyzed in mole percent on an oxide basis, includes 64 to 69 mol % $SiO_2$, 11 to 13 mol % $Al_2O_3$, 6 to 8 mol % $B_2O_3$, 2 to 6 mol % MgO, 3 to 8 mol % CaO, and 1 to 6 mol % SrO. The glass further includes sulfur. According to an aspect C2, the glass of aspect C1 includes greater than 25 ppm of sulfur. According to an C3, the glass of aspect C2 or aspect C1 includes less than 0.25 mol % of alkali metal oxides, in combination, and less than 0.5 mol % of baria.

Additional features and advantages are set forth in the detailed description that follows, and in part will be readily apparent to those skilled in the art from the description or recognized by practicing the technology as described in the written description and claims hereof, as well as the appended drawings. It is to be understood that both the foregoing general description and the following detailed description are merely exemplary and are intended to provide an overview or framework to understand the nature and character of the claims.

BRIEF DESCRIPTION OF THE FIGURES

The accompanying figures are included to provide a further understanding and are incorporated in and constitute a part of this specification. The drawings of the figures illustrate one or more aspects of the present disclosure, and together with the detailed description explain principles and operations of the various aspects. As such, the disclosure will become more fully understood from the following detailed description, taken in conjunction with the accompanying figures, in which.

DETAILED DESCRIPTION

Before turning to the following detailed description and figures, which illustrate aspects of the present disclosure in detail, it should be understood that the present inventive technology is not limited to the details or methodology set forth in the detailed description or illustrated in the figures. For example, as will be understood by those of ordinary skill in the art, features and attributes associated with an aspect shown in one of the figures or described in the text relating to an aspect may be applied to another aspect shown in another of the figures or described elsewhere in the text.

Figure 1:
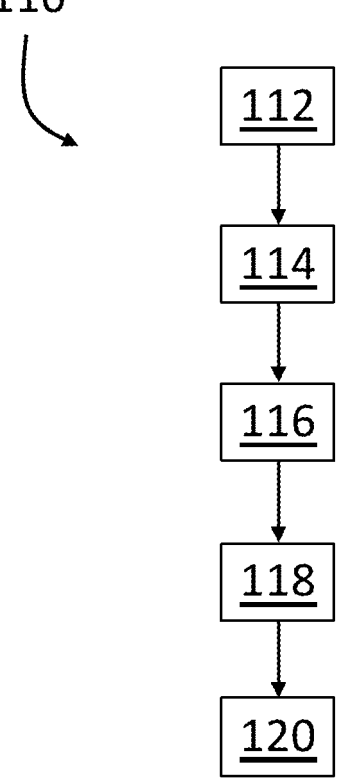
FIG. 1 is flow chart of a method of making a glass sheet according to an aspect of the present disclosure
Figure 3:
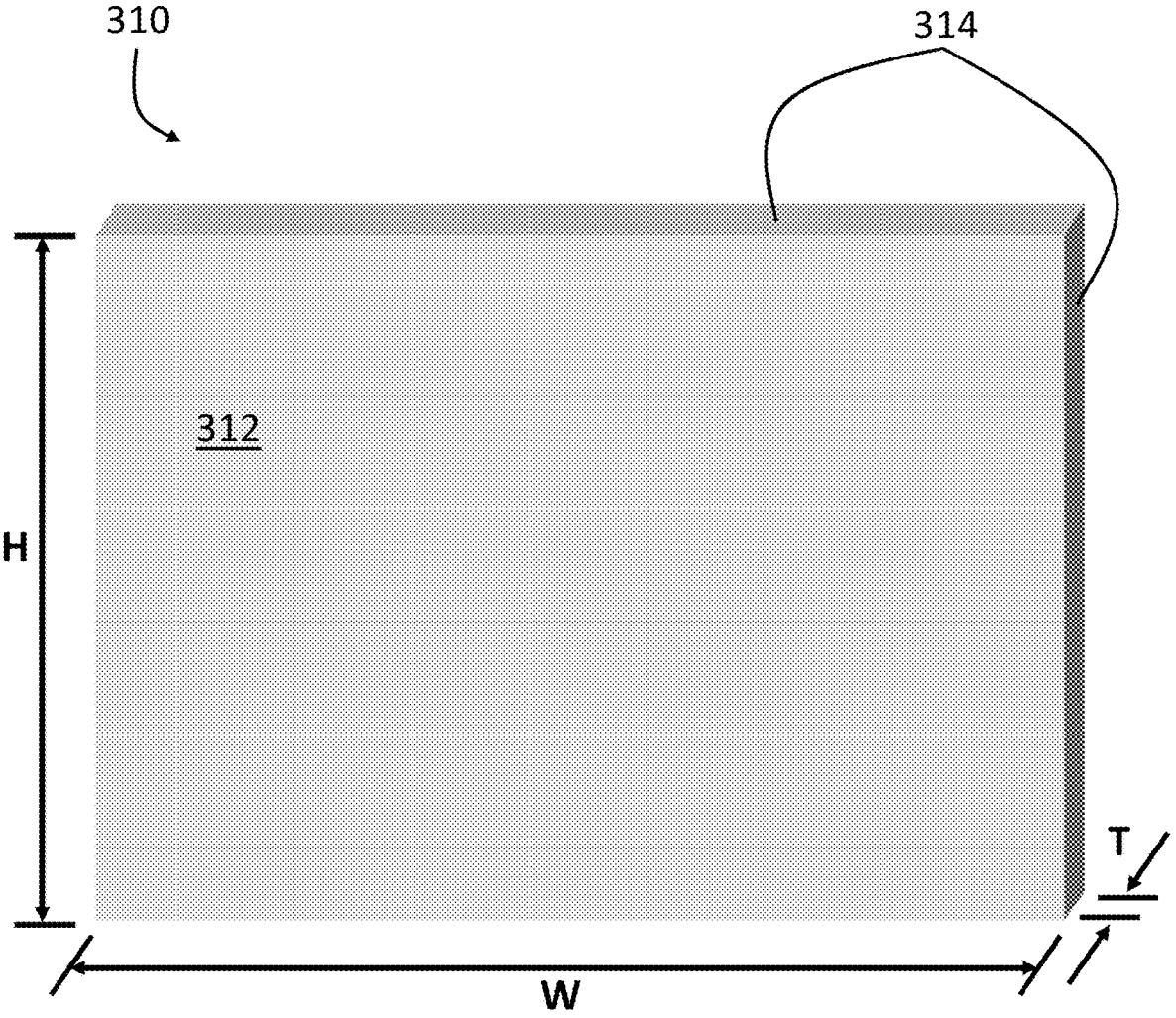
FIG. 3 is a perspective view of a sheet of glass according to an aspect of the present disclosure.
Figure 4:
FIG. 4 is front view of a display according to an aspect of the present disclosure.
Figure 4:
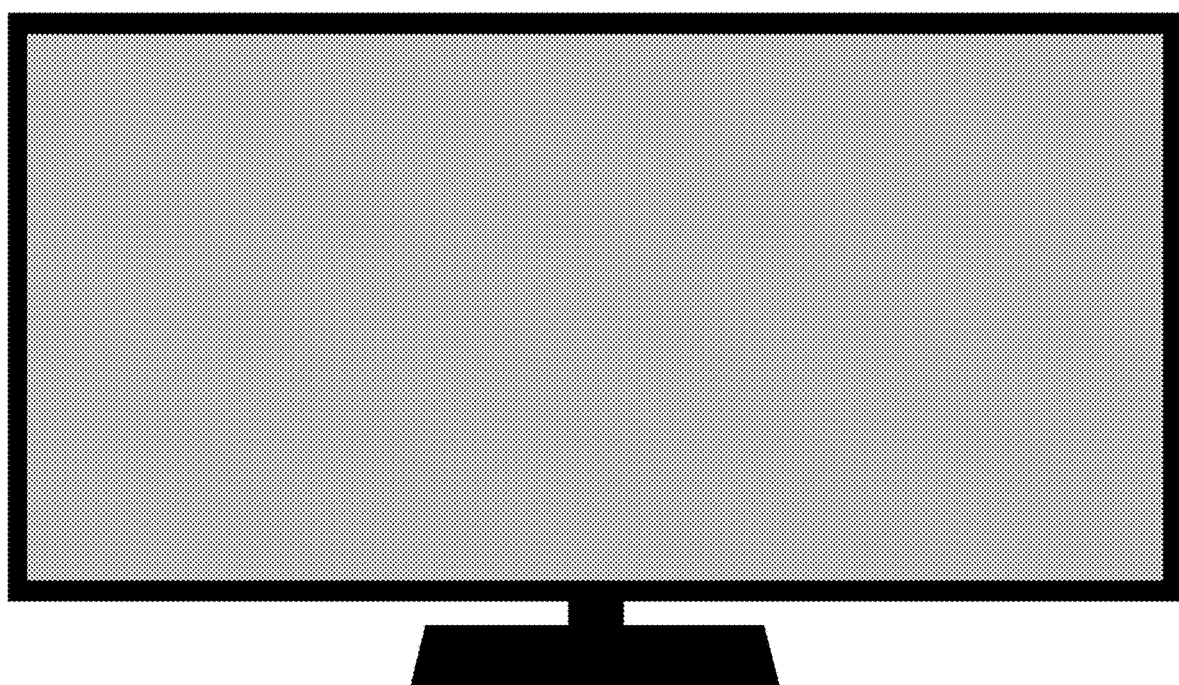

Referring to FIG. 1, a method 110 of making glass (e.g., sheet 310 of FIG. 3) for a display (e.g., display 410 of FIG. 4; OLED, LCD, LED, micro-LED, high-definition display, ultra-high-definition display, television, monitor) includes a step of batching 112 constituents, including silica, alumina, boria, magnesia, quicklime, and strontia, where one or more of the constituents is from "dirty" raw material that includes greater than 100 ppm sulfur, such as greater than 1000 ppm. The glass is free or mostly free of baria.

According to an aspect of the present disclosure, glasses herein include silica, $SiO_2$. The $SiO_2$ serves as the basic glass former. Concentration of $SiO_2$ can be 64 mole percent or greater in order to provide the glass with a density and chemical durability suitable for a flat panel display glass, and a liquidus temperature (liquidus viscosity), that allows the glass to be formed by a downdraw process (e.g., a fusion process). In terms of an upper limit, in general, the $SiO_2$ concentration can be less than or equal to about 70 mole percent to allow batch materials to be melted using conventional, high volume, melting techniques, e.g., Joule melting in a refractory melter. As the concentration of $SiO_2$ increases, the 200 poise temperature (melting temperature) generally rises.

According to an aspect, silica as-batched and/or as-analyzed in mole percent on an oxide basis is greater than or equal to 64 mol %, such as greater than or equal to 64.9 mol %, and/or less than or equal to 70 mol %, such as less than or equal to 69 mol %, such as less than or equal to 68.7 mol %.

According to an aspect of the present disclosure, glasses herein include alumina, $Al_2O_3$. The $Al_2O_3$ is another glass former and Applicants find $Al_2O_3$ concentration greater than or equal to 11 mole percent provides the glass with a low liquidus temperature and high viscosity, resulting in a high liquidus viscosity. Use of at least 12 mole percent $Al_2O_3$ also improves the annealing point and modulus of such glasses. The upper bound may allow for balancing alumina and combined alkaline earth oxides, as further discussed herein.

According to an aspect, alumina as-batched and/or as-analyzed in mole percent on an oxide basis is greater than or equal to 11 mol %, such as greater than or equal to 11.5 mol %, such as greater than or equal to 12 mol %, and/or less than or equal to 13.3 mol %, such as less than or equal to 13 mol %, such as less than or equal to 12.9 mol %.

According to an aspect of the present disclosure, glasses herein include boria, $B_2O_3$. The $B_2O_3$ is both a glass former and a flux that aids melting and lowers the melting temperature. The impact of boria on liquidus temperature is at least as great as the impact of boria on viscosity, so increasing $B_2O_3$ can be used to increase the liquidus viscosity of a glass. To achieve useful liquidus viscosity of glasses as disclosed herein for manufacturing (e.g., forming), the compositions have $B_2O_3$ concentrations equal to or greater than 6 mole percent. However, annealing point decreases as $B_2O_3$ increases, as does the Young's Modulus, so for benefit of durability as disclosed herein, it is desirable to keep $B_2O_3$ content low relative to its typical concentration in amorphous silicon substrates.

According to an aspect, boria as-batched and/or as-analyzed in mole percent on an oxide basis is greater than or equal to 6 mol %, such as greater than or equal to 6.1 mol %, and/or less than or equal to 8 mol %, such as less than or equal to 7.5 mol %, such as less than or equal to 7.2 mol %.

In addition to the glass formers, glasses described herein also include a subset of alkaline earth oxides: MgO, CaO, and SrO. The alkaline earth oxides MgO, CaO, and SrO provide the glass with various properties important to melting, fining, forming, and ultimate use. According to an aspect of the present disclosure, at least three different alkaline earth oxides are included in the glass composition. However, according to an aspect, the subset of alkaline earth oxides does not include BaO, as further explained herein.

According to an aspect of the present disclosure, glasses herein include magnesia, MgO. Applicants find that addition and/or super-addition of MgO may serve to lower the liquidus temperature of corresponding glass. At the same time, the viscosity curve typically becomes steeper with addition of MgO, reducing melting temperatures while having little or no impact on low-temperature viscosities. Further Applicants find that addition of relatively small amounts of MgO benefits melting by reducing melting temperatures, benefits forming by reducing liquidus temperatures and increasing liquidus viscosity, while preserving high annealing point and low compaction.

In terms of quantitative amounts, according to an aspect, magnesia as-batched and/or as-analyzed in mole percent on an oxide basis is greater than or equal to 2%, such as greater than or equal to 2.5%, and/or less than or equal to 7.5%, such as less than or equal to 6%, such as less than or equal to 5.6%.

According to an aspect of the present disclosure, glasses herein include calcium oxide or "quicklime," CaO. Applicants find calcium oxide in the presently disclosed glasses may contribute to lower liquidus temperatures, higher liquidus viscosities, higher annealing points and moduli, and coefficients of thermal expansion desirable for certain uses, such as with flat panel, high definition, and ultra-high definition displays (see generally display 410 of FIG. 4). Applicants find calcium oxide also contributes favorably to chemical durability of the presently disclosed glasses. However, at high concentrations, CaO increases the density and coefficients of thermal expansion.

According to an aspect, calcium oxide as-batched and/or as-analyzed in mole percent on an oxide basis is greater than or equal to 3%, such as greater than or equal to 3.5%, such as greater than or equal to 3.9%, and/or less than or equal to 8%, such as less than or equal to 7.5%.

According to an aspect of the present disclosure, glasses herein include strontia, SrO. Applicants find that SrO in the presently disclosed glasses may contribute both to low liquidus temperatures and high liquidus viscosities. However, the selection and concentration of these alkaline earth oxides may be balanced with other constituents disclosed herein so as to obtain a suitable combination of physical properties and liquidus viscosity such that the glass can be formed by a downdraw process for example.

According to an aspect, strontia as-batched and/or as-analyzed in mole percent on an oxide basis is greater than or equal to 3%, such as greater than or equal to 3.1%, and/or less than or equal to 6%, such as less than or equal to 5.5%.

Applicants find that sources and raw materials that provide oxides disclosed herein may carry sulfur and oxides of sulfur (e.g., $SO_2$, $SO_3$) as an impurity in different relative amounts. For example, some "dirty" sources of strontia may be mostly strontianite $SrCO_3$ raw material that carries greater than 100 ppm $SO_2$ of sulfur content, such as greater than 200 ppm $SO_2$ of sulfur content, such as greater than or equal to 225 ppm, such as greater than or equal to 250 ppm, such as greater than or equal to 300 ppm, such as greater than or equal to 500 ppm, such as greater than or equal to even 1000 ppm, such as greater than or equal to even 1500 ppm, such as greater than or equal to even 2000 ppm, such as greater than or equal to even 2500 ppm, such as greater than or equal to even 3000 ppm in some instances. Other sources of strontium, such as celestite, may carry more sulfur. Notably, this parts per million is of the raw material, such as $SrCO_3$, not of the batch. When the raw material with $SO_2$ impurity content is added to the batch, the $SO_2$ may make up more than 200 ppm of the batch, such as greater than or equal to 225 ppm, such as greater than or equal to 250 ppm, such as greater than or equal to even 300 ppm of the batch. Also note, by convention "$SO_2$" herein and in the claims, unless otherwise specified, is representative of oxides of sulfur and sulfur content may in reality have been provided as other such sulfur compounds, such as $SO_3$.

Similarly, some or all of the other alkaline earth oxides and other oxides disclosed herein may carry such amounts of sulfur. When such "dirty" raw material sources are used, the amount of sulfur included in the batch may be significant, which had previously been thought to result in excessive blistering. However, as further explained herein, composition discoveries disclosed herein in combination with inventive processes in glass making, may allow for such amounts of sulfur without excessive blistering.

According to an aspect of the present disclosure, while the glasses include the above-described subset of alkaline earth oxides, glasses disclosed herein may be free or at least mostly free of baria, BaO. While BaO may have benefits in some glasses, such as for influencing liquidus viscosity, Applicants discovered that BaO in particular may exacerbate blistering in glasses as disclosed herein, such as glasses made with raw materials containing substantial amounts of sulfur.

According to an aspect, glasses disclosed herein may not include much BaO if any as-batched and/or as-analyzed, such as less than or equal to 1 mol % on an oxide basis, such as less than or equal to 0.5 mol %, such as less than or equal to 0.25 mol %, such as less than or equal to 0.1 mol %, and/or less than or equal to 2000 ppm of the batch or glass as analyzed, such as less than or equal to 1000 ppm, such as less than or equal to 500 ppm, such as less than or equal to 250 ppm, such as less than or equal to 200 ppm, such as less than or equal to 100 ppm of the batch or glass as analyzed.

Applicants have found that the ratio of the combined molar percentage of the subset of alkaline earth metal oxides to the amount of alumina helps achieve suitably high values for liquidus viscosity for forming large sheets of thin glass, as disclosed herein. According to an aspect, this ratio of $(MgO+CaO+SrO)/Al_2O_3$ as-batched and/or as-analyzed in mole percent on an oxide basis is greater than or equal to 0.95, such as greater than or equal to 1, such as greater than or equal to 1.05, such as greater than or equal to 1.1, and/or less than or equal to 1.3, such as less than or equal to 1.25, such as less than or equal to 1.24.

In addition to the above-disclosed constituents (or non-constituents, such as baria), glasses described herein may optionally include various other oxides, such as to influence various physical, melting, fining, and forming attributes of the glasses according to an aspect of the present disclosure. Such "optional" oxides include $TiO_2$, MnO, $Fe_2O_3$, ZnO, $Nb_2O_5$, $MoO_3$, $ZrO_2$, $Ta_2O_5$, $WO_3$, $Y_2O_3$, $La_2O_3$, and $CeO_2$.

According to an aspect, the optional oxides as-batched and/or as-analyzed in mole percent on an oxide basis individually ($TiO_2$, MnO, $Fe_2O_3$, ZnO, $Nb_2O_5$, $MoO_3$, $ZrO_2$, $Ta_2O_5$, $WO_3$, $Y_2O_3$, $La_2O_3$, or $CeO_2$) may be less than or equal to 2%, such as less than or equal to 1.5%, such as less than or equal to 1%, such as less than or equal to 2000 ppm of the batch or glass as analyzed, such as less than or equal to 1000 ppm, such as less than or equal to 500 ppm, such as less than or equal to 200 ppm, such as less than or equal to 100 ppm, and/or the glass may be free of some and/or all of these oxides (and corresponding non-oxygen elements). According to an aspect, the optional oxides as-batched and/or as-analyzed in mole percent on an oxide basis in combination ($TiO_2$, MnO, $Fe_2O_3$, ZnO, $Nb_2O_5$, $MoO_3$, $ZrO_2$, $Ta_2O_5$, $WO_3$, $Y_2O_3$, $La_2O_3$, and $CeO_2$) may be less than or equal to 5%, such as less than or equal to 4%, such as less than or equal to 2%, such as less than or equal to 2000 ppm of the batch or glass as analyzed, such as less than or equal to 1000 ppm, such as less than or equal to 500 ppm, such as less than or equal to 200 ppm, such as less than or equal to 100 ppm, and/or the glass may be free of some and/or all of these oxides (and corresponding non-oxygen elements).

Further, the glass compositions may also include various "contaminants" oxides associated with batch materials and/ or introduced into the glass by the melting, fining, and/or forming equipment used to produce the glass, such as $ZrO_2$ and $Fe_2O_3$ (again "$Fe_2O_3$" by convention, but referring to oxides of iron). Similarly, glasses disclosed herein may also contain $SnO_2$ either as a result of Joule melting using tin-oxide electrodes and/or through batching of tin containing materials, e.g., $SnO_2$, $SnO$, $SnCO_3$, $SnC_2O_2$, etc.

According to an aspect, the contaminants oxides as-batched and/or as-analyzed in mole percent on an oxide basis individually ($Fe_2O_3$, $ZrO_2$, or $SnO_2$) may be less than or equal to 2%, such as less than or equal to 1.5%, such as less than or equal to 1%, such as less than or equal to 2000 ppm of the batch or glass as analyzed, such as less than or equal to 1000 ppm, such as less than or equal to 500 ppm, such as less than or equal to 200 ppm, such as less than or equal to 100 ppm, and/or the glass may be free of some and/or all of these oxides (and corresponding non-oxygen elements). According to an aspect, the contaminants oxides as-batched and/or as-analyzed in mole percent on an oxide basis in combination ($Fe_2O_3$, $ZrO_2$, and $SnO_2$) may be less than or equal to 5%, such as less than or equal to 4%, such as less than or equal to 2%, such as less than or equal to 2000 ppm of the batch or glass as analyzed, such as less than or equal to 1000 ppm, such as less than or equal to 500 ppm, such as less than or equal to 200 ppm, such as less than or equal to 100 ppm, and/or the glass may be free of some and/or all of these oxides (and corresponding non-oxygen elements).

According to an aspect, glasses disclosed herein may be mostly or fully alkali free. Applicants find that for high definition and ultra-high definition display uses, it may be desirable to keep alkali metal oxide levels in the glass below 0.1 mole percent to avoid having a negative impact on thin film transistor (TFT) performance through diffusion of alkali ions from the glass into silicon of the TFT.

According to an aspect, the alkali metal oxides as-batched and/or as-analyzed in mole percent on an oxide basis individually (e.g., $Na_2O$, $K_2O$, $Li_2O$, $Rb_2O$, or $Cs_2O$) may be less than or equal to 0.5%, such as less than or equal to 0.25%, such as less than or equal to 0.1%, such as less than or equal to 2000 ppm of the batch or glass as analyzed, such as less than or equal to 1000 ppm, such as less than or equal to 500 ppm, such as less than or equal to 200 ppm, such as less than or equal to 100 ppm, and/or the glass may be free of some and/or all of these oxides (and corresponding non-oxygen elements). According to an aspect, the alkali metal oxides—batched and/or as-analyzed in mole percent on an oxide basis in combination (e.g., $Na_2O$, $K_2O$, $Li_2O$, $Rb_2O$, and $Cs_2O$) may be less than or equal to 1%, such as less than or equal to 0.5%, such as less than or equal to 0.25%, such as less than or equal to 0.1%, such as less than or equal to 2000 ppm of the batch or glass as analyzed, such as less than or equal to 1000 ppm, such as less than or equal to 500 ppm, such as less than or equal to 200 ppm, such as less than or equal to 100 ppm, and/or the glass may be free of some and/or all of these oxides (and corresponding non-oxygen elements).

Figure 2:
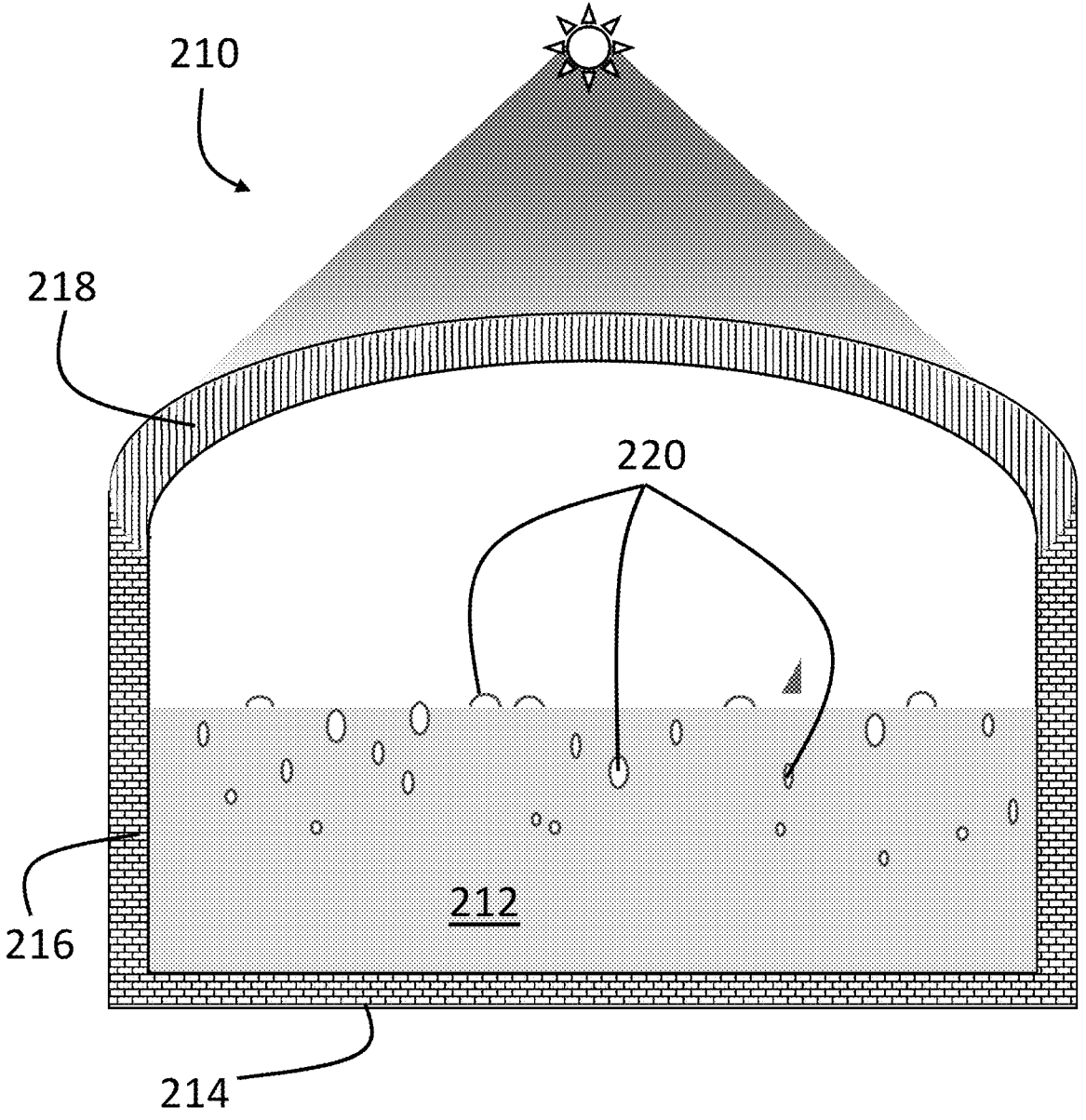
FIG. 2 is a front sectional view of a glass furnace according to an aspect of the present disclosure.

Referring again to FIG. 1, the method 110 further includes steps melting 114 and mixing 116 the batch to make glass having sulfur content but free of blisters, suitable for high performance displays (see generally display 410 of FIG. 4). Referring now to FIG. 2, melting of glass 212, as disclosed herein, may occur in a furnace 210. The furnace 210 includes refractory materials (e.g., zirconia) forming a bottom 214, side walls 216, and a crown 218.

During manufacturing, beyond heating the glass furnace 210 to melt glass constituents, Applicants believe that specifically heating the crown 218 of the glass furnace 210 facilitates sulfur outgassing from the glasses disclosed herein, shown as bubbles 220 in FIG. 2. If not outgassed, such bubbles 220 may become trapped as blisters in solidified glass. However, heating the crown 218 may raise temperatures of gases in the furnace 210 overlaying the glass 212 and also a top portion of the glass 212, which may soften the bubbles 220 and locally influence viscosity of the top portion of the glass 212, facilitating release of sulfur-carrying gases. Applicants believe most (i.e. >50%), but not all sulfur, leaves the glass via the outgassing. Advantageously, Applicants discovered the sulfur outgassing improves kinetics of melted glass, allowing for the manufacturing with a lesser amount of nitrates (e.g., sodium nitrate or other chemicals containing nitrogen and oxygen) or other materials used to facilitate manufacturing, such as for fining or decoloring, essentially the impurity sulfur of raw materials replaces agents normally added to achieve high-quality, low-defect glass. According to an aspect, the nitrates as-batched in mole percent on an oxide basis in combination may be less than or equal to 3%, such as less than or equal to 1%, such as less than or equal to 0.5%, such as less than or equal to 0.25%.

In FIG. 2, the crown 218 of the furnace 210 is heated by a conceptual heat source 222. The heat source 222 may be above and exterior to the crown 218 as shown, embedded within the crown 218, within an interior of the furnace and at least partially directed to the crown 218, or a combination thereof. The heat source 222 may be a resistive element, a combustible source, directed energy, plasma, microwave, or other sources of heat. According to an aspect of the present disclosure, the heat source 222 provides greater than 0.5 kJ of heat to the crown 218 per kg of the molten glass 212 in the furnace 210, such as greater than 1 kJ, such as greater than 2 kJ, such as greater than 10 kJ. However, in other instance the amount of heat provided and focused on the crown 218 may be less.

Referring again to FIG. 1, the method 110 further includes steps of forming 118 the glass, such as into a flat sheet for use with a display (see generally display 410 of FIG. 4), and cooling 120 the glass, such as below 100° C. to solidify the glass. Applicants have found that fusion forming of glass sheets, where the molten glass overflows sides of trough or "isopipe," produces particularly fine surface quality, which is useful for excellent optical properties, as may be desired for glasses used with displays. The viscosities and corresponding temperatures and performance of glasses disclosed herein allow for fusion forming. However, other methods may be used to form the glass, such as so-called "float" forming, where the molten glass floats on a bath of denser liquid and may be subsequently polished to achieve sufficient surface quality as may be required for certain displays.

Referring now to FIG. 3, glasses disclosed herein may be formed and cooled as a sheet 310 having a first face 312 (e.g., front face) and a second face opposite the first face (e.g., back face). The face 312 has a height H and a width W. Further, the sheet 310 has a thickness T between the first face 312 and the second face, and edges 314 extending between the faces and defining a perimeter of the sheet 310. The thickness T of the glass sheet 310 may be less than the height H and width W. For example, the thickness T of the glass sheet may be less than 5% of the height H and/or width W, such as less than 3%, such as less than 1.5%. For example, the thickness T may be less than 5 mm, such as less than 3 mm, such within 0.4 mm of 2 mm, and/or at least 20 µm. The width W and height H may correspond with so-called Gen 8, Gen 9, Gen 10, Gen 10.5 sizing for use in a high definition or ultra-high definition displays. According to an aspect of the present disclosure the height H may be greater than the width W. According to an aspect the height H and/or width W may be greater than or equal to 10 cm, such as greater than or equal to 25 cm, such as greater than or equal to 50 cm, such as greater than or equal to 1 m. However, while particularly useful for high-performance displays, Applicants contemplate glass of the present disclosure may be formed into otherwise shaped articles and may be used for other purposes.

While the sheet of FIG. 3 is shown as a rectangular sheet having a constant height H, width W, and thickness T, other geometry sheets are contemplated. For example, the glass may be formed into a round or circular sheet, the sheet may bend or curve, such as when fitted to a curved display, portions of the sheet may be thicker than other portions, such as with the sheet having a so-called "living hinge" of narrower thickness about which the sheet may fold. Portions of the edge may not be straight, such as having cut-outs to facilitate portions of other parts of a corresponding display (e.g., frame, logo, console). Also Applicants contemplate glasses disclosed herein may be used for purposes other than display glass, such as instead for windows, glasses overlaying other devices (e.g., photovoltaic cells), substrates for devices (e.g. antenna, electronics).

EXAMPLES

In the following Table, Applicants list constituent contents in mole percent on an oxide basis of 90 different glass samples having properties as disclosed herein, along with the ratio of $RO/Al_2O_3$ (usually without any baria contribution) and an estimate of $SO_2$ in parts per million of the overall batch, provided to the batch as known impurities in the raw materials, such as from a "dirty" strontia source in combination with sulfur in other constituent sources. Although listed as $SO_2$ by convention in the Table, $SO_2$ is a representative oxide of sulfur and the sulfur content may in reality have been provided as other sulfur compounds, such $SO_3$.

Further, while contents of the Table are as-batched, the contents are also representative of as-analyzed with exception of the $SO_2$, which has been measured to be significantly reduced in the finished glass due to outgassing as disclosed herein. For example, the as-analyzed sulfur content for glasses of the Table has been measured at approximately 40 ppm using X-ray fluorescence (XRF). However, this content may vary depending upon materials and processing (e.g., use of crown heating technique, fining, starting content, baria concentration, etc.).

TABLE

| mol % | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| $SiO_2$ | 67.28 | 67.11 | 68.11 | 66.29 | 67.11 | 66.34 | 67.57 | 68.19 | 68.16 | 67.45 |
| $Al_2O_3$ | 12.24 | 12.34 | 11.51 | 12.18 | 12.39 | 12.46 | 12.46 | 11.64 | 11.85 | 12.01 |
| $B_2O_3$ | 6.20 | 6.27 | 6.12 | 6.98 | 6.68 | 7.06 | 6.14 | 6.23 | 6.18 | 6.53 |
| MgO | 4.03 | 4.25 | 3.40 | 4.51 | 3.95 | 3.94 | 3.93 | 3.35 | 3.10 | 3.03 |
| CaO | 6.65 | 6.29 | 6.42 | 6.18 | 6.19 | 6.84 | 6.18 | 6.24 | 6.85 | 6.73 |
| SrO | 3.49 | 3.63 | 4.33 | 3.75 | 3.57 | 3.25 | 3.61 | 4.23 | 3.75 | 4.14 |
| BaO | 0.00 | 0.00 | 0.00 | 0.00 | 0.00 | 0.00 | 0.00 | 0.00 | 0.00 | 0.00 |
| $SnO_2$ | 0.10 | 0.09 | 0.09 | 0.09 | 0.09 | 0.09 | 0.09 | 0.09 | 0.09 | 0.09 |
| $Fe_2O_3$ | 0.01 | 0.01 | 0.01 | 0.01 | 0.01 | 0.01 | 0.01 | 0.01 | 0.01 | 0.01 |
| $ZrO_2$ | 0.01 | 0.01 | 0.00 | 0.00 | 0.01 | 0.01 | 0.01 | 0.00 | 0.01 | 0.00 |
| $Na_2O$ | 0.00 | 0.00 | 0.00 | 0.00 | 0.00 | 0.00 | 0.00 | 0.00 | 0.00 | 0.00 |
| $K_2O$ | 0.01 | 0.01 | 0.01 | 0.01 | 0.01 | 0.01 | 0.01 | 0.01 | 0.01 | 0.01 |
| $TiO_2$ | 0.00 | 0.00 | 0.00 | 0.00 | 0.00 | 0.00 | 0.00 | 0.00 | 0.00 | 0.00 |
| $RO/Al_2O_3$ | 1.16 | 1.15 | 1.23 | 1.19 | 1.11 | 1.13 | 1.10 | 1.19 | 1.16 | 1.16 |
| $SO_2$ (ppm) | 136 | 142 | 169 | 146 | 139 | 127 | 141 | 165 | 146 | 161 |

| mol % | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|
| $SiO_2$ | 68.40 | 68.03 | 67.56 | 66.44 | 66.69 | 68.69 | 66.52 | 67.57 | 66.43 | 66.28 |
| $Al_2O_3$ | 12.07 | 11.77 | 12.22 | 12.01 | 12.00 | 11.57 | 12.00 | 12.13 | 12.58 | 12.47 |
| $B_2O_3$ | 6.10 | 6.42 | 6.54 | 7.15 | 7.04 | 6.24 | 7.23 | 6.70 | 6.49 | 6.49 |
| MgO | 3.10 | 2.54 | 3.55 | 3.84 | 3.85 | 2.58 | 4.24 | 3.73 | 4.34 | 4.39 |
| CaO | 6.69 | 6.82 | 5.21 | 6.78 | 7.11 | 6.89 | 6.69 | 5.95 | 6.92 | 6.48 |
| SrO | 3.53 | 4.31 | 4.83 | 3.66 | 3.20 | 3.91 | 3.21 | 3.80 | 3.11 | 3.76 |
| BaO | 0.00 | 0.00 | 0.00 | 0.00 | 0.00 | 0.00 | 0.00 | 0.00 | 0.00 | 0.00 |
| $SnO_2$ | 0.09 | 0.09 | 0.09 | 0.09 | 0.09 | 0.09 | 0.09 | 0.09 | 0.10 | 0.09 |
| $Fe_2O_3$ | 0.01 | 0.01 | 0.01 | 0.01 | 0.01 | 0.01 | 0.01 | 0.01 | 0.01 | 0.01 |
| $ZrO_2$ | 0.01 | 0.00 | 0.00 | 0.01 | 0.01 | 0.00 | 0.01 | 0.01 | 0.01 | 0.01 |
| $Na_2O$ | 0.00 | 0.00 | 0.00 | 0.00 | 0.00 | 0.00 | 0.00 | 0.00 | 0.00 | 0.00 |
| $K_2O$ | 0.01 | 0.01 | 0.01 | 0.01 | 0.01 | 0.01 | 0.01 | 0.01 | 0.01 | 0.01 |
| $TiO_2$ | 0.00 | 0.00 | 0.00 | 0.00 | 0.00 | 0.00 | 0.00 | 0.00 | 0.00 | 0.00 |
| $RO/Al_2O_3$ | 1.10 | 1.16 | 1.11 | 1.19 | 1.18 | 1.16 | 1.18 | 1.11 | 1.14 | 1.17 |
| $SO_2$ (ppm) | 138 | 167 | 186 | 143 | 125 | 152 | 126 | 148 | 122 | 147 |

| mol % | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|
| $SiO_2$ | 66.42 | 66.91 | 66.23 | 66.19 | 66.27 | 66.23 | 65.89 | 66.38 | 65.94 | 66.36 |
| $Al_2O_3$ | 12.43 | 12.32 | 12.04 | 12.18 | 12.02 | 12.49 | 12.43 | 12.09 | 12.55 | 12.12 |
| $B_2O_3$ | 6.62 | 6.61 | 6.67 | 6.83 | 6.71 | 7.24 | 7.33 | 7.47 | 7.51 | 7.52 |
| MgO | 3.95 | 3.48 | 5.52 | 4.33 | 5.53 | 3.99 | 3.88 | 3.71 | 3.99 | 4.22 |
| CaO | 6.62 | 6.62 | 4.71 | 6.42 | 3.91 | 6.83 | 6.91 | 6.66 | 6.72 | 6.40 |
| SrO | 3.84 | 3.94 | 4.71 | 3.93 | 5.44 | 3.11 | 3.45 | 3.57 | 3.18 | 3.26 |

TABLE-continued

| | | | | | | | | | | |
|---|---|---|---|---|---|---|---|---|---|---|
| BaO | 0.00 | 0.00 | 0.00 | 0.00 | 0.00 | 0.00 | 0.00 | 0.00 | 0.00 | 0.00 |
| $SnO_2$ | 0.09 | 0.10 | 0.09 | 0.09 | 0.08 | 0.09 | 0.09 | 0.08 | 0.08 | 0.08 |
| $Fe_2O_3$ | 0.01 | 0.01 | 0.01 | 0.01 | 0.01 | 0.01 | 0.01 | 0.01 | 0.01 | 0.01 |
| $ZrO_2$ | 0.01 | 0.01 | 0.01 | 0.01 | 0.01 | 0.01 | 0.01 | 0.01 | 0.01 | 0.01 |
| $Na_2O$ | 0.00 | 0.00 | 0.00 | 0.00 | 0.00 | 0.00 | 0.00 | 0.00 | 0.00 | 0.00 |
| $K_2O$ | 0.01 | 0.01 | 0.01 | 0.01 | 0.01 | 0.01 | 0.01 | 0.01 | 0.01 | 0.01 |
| $TiO_2$ | 0.00 | 0.00 | 0.00 | 0.00 | 0.00 | 0.00 | 0.00 | 0.00 | 0.00 | 0.00 |
| $RO/Al_2O_3$ | 1.16 | 1.14 | 1.24 | 1.21 | 1.24 | 1.12 | 1.15 | 1.15 | 1.11 | 1.15 |
| $SO_2$ (ppm) | 149 | 153 | 183 | 153 | 211 | 121 | 134 | 139 | 124 | 128 |

| mol % | Ex. 31 | Ex. 32 | Ex. 33 | Ex. 34 | Ex. 35 | Ex. 36 | Ex. 37 | Ex. 38 | Ex. 39 | Ex. 40 |
|---|---|---|---|---|---|---|---|---|---|---|
| $SiO_2$ | 66.27 | 66.28 | 66.29 | 66.47 | 66.76 | 66.29 | 66.25 | 66.53 | 66.18 | 66.09 |
| $Al_2O_3$ | 12.23 | 12.32 | 12.39 | 12.08 | 11.96 | 12.47 | 12.44 | 12.17 | 12.36 | 12.47 |
| $B_2O_3$ | 7.39 | 7.52 | 7.45 | 7.47 | 7.38 | 6.53 | 6.92 | 6.88 | 6.98 | 7.12 |
| MgO | 3.84 | 3.52 | 4.13 | 3.80 | 5.57 | 4.38 | 3.95 | 3.85 | 3.92 | 3.97 |
| CaO | 6.83 | 6.98 | 6.49 | 6.40 | 5.05 | 6.49 | 6.74 | 6.70 | 6.75 | 6.69 |
| SrO | 3.32 | 3.27 | 3.14 | 3.66 | 3.16 | 3.73 | 3.58 | 3.76 | 3.71 | 3.55 |
| BaO | 0.00 | 0.00 | 0.00 | 0.00 | 0.00 | 0.00 | 0.00 | 0.00 | 0.00 | 0.00 |
| $SnO_2$ | 0.09 | 0.08 | 0.08 | 0.08 | 0.08 | 0.08 | 0.09 | 0.09 | 0.08 | 0.09 |
| $Fe_2O_3$ | 0.01 | 0.01 | 0.01 | 0.01 | 0.01 | 0.01 | 0.01 | 0.01 | 0.01 | 0.01 |
| $ZrO_2$ | 0.01 | 0.01 | 0.01 | 0.01 | 0.01 | 0.01 | 0.01 | 0.01 | 0.01 | 0.01 |
| $Na_2O$ | 0.00 | 0.00 | 0.00 | 0.00 | 0.00 | 0.00 | 0.00 | 0.00 | 0.00 | 0.00 |
| $K_2O$ | 0.01 | 0.01 | 0.01 | 0.01 | 0.01 | 0.01 | 0.01 | 0.01 | 0.01 | 0.01 |
| $TiO_2$ | 0.00 | 0.00 | 0.00 | 0.00 | 0.00 | 0.00 | 0.00 | 0.00 | 0.00 | 0.00 |
| $RO/Al_2O_3$ | 1.14 | 1.12 | 1.11 | 1.15 | 1.15 | 1.17 | 1.15 | 1.18 | 1.16 | 1.14 |
| $SO_2$ (ppm) | 130 | 128 | 123 | 143 | 124 | 145 | 140 | 147 | 144 | 138 |

| mol % | Ex. 41 | Ex. 42 | Ex. 43 | Ex. 44 | Ex. 45 | Ex. 46 | Ex. 47 | Ex. 48 | Ex. 49 | Ex. 50 |
|---|---|---|---|---|---|---|---|---|---|---|
| $SiO_2$ | 66.25 | 66.60 | 66.19 | 66.18 | 66.80 | 66.61 | 65.78 | 66.56 | 66.57 | 66.40 |
| $Al_2O_3$ | 12.30 | 11.92 | 12.24 | 12.32 | 12.28 | 12.46 | 12.46 | 12.32 | 12.18 | 12.19 |
| $B_2O_3$ | 6.96 | 7.06 | 7.07 | 7.11 | 6.55 | 7.03 | 7.38 | 6.50 | 6.99 | 7.10 |
| MgO | 4.11 | 4.01 | 4.05 | 4.15 | 3.88 | 3.83 | 3.86 | 4.32 | 3.79 | 3.54 |
| CaO | 6.64 | 6.52 | 6.65 | 6.57 | 6.56 | 6.75 | 7.18 | 6.46 | 6.34 | 6.79 |
| SrO | 3.63 | 3.78 | 3.69 | 3.56 | 3.82 | 3.21 | 3.23 | 3.73 | 4.02 | 3.88 |
| BaO | 0.00 | 0.00 | 0.00 | 0.00 | 0.00 | 0.00 | 0.00 | 0.00 | 0.00 | 0.00 |
| $SnO_2$ | 0.08 | 0.08 | 0.08 | 0.08 | 0.08 | 0.08 | 0.08 | 0.08 | 0.08 | 0.08 |
| $Fe_2O_3$ | 0.01 | 0.01 | 0.01 | 0.01 | 0.01 | 0.01 | 0.01 | 0.01 | 0.01 | 0.01 |
| $ZrO_2$ | 0.01 | 0.01 | 0.01 | 0.01 | 0.01 | 0.01 | 0.01 | 0.01 | 0.00 | 0.01 |
| $Na_2O$ | 0.00 | 0.00 | 0.00 | 0.00 | 0.00 | 0.00 | 0.00 | 0.00 | 0.00 | 0.00 |
| $K_2O$ | 0.01 | 0.01 | 0.01 | 0.01 | 0.01 | 0.01 | 0.01 | 0.01 | 0.01 | 0.01 |
| $TiO_2$ | 0.00 | 0.00 | 0.00 | 0.00 | 0.00 | 0.00 | 0.00 | 0.00 | 0.00 | 0.00 |
| $RO/Al_2O_3$ | 1.17 | 1.20 | 1.18 | 1.16 | 1.16 | 1.11 | 1.15 | 1.18 | 1.16 | 1.17 |
| $SO_2$ (ppm) | 142 | 147 | 144 | 139 | 149 | 125 | 126 | 146 | 156 | 151 |

| mol % | Ex. 51 | Ex. 52 | Ex. 53 | Ex. 54 | Ex. 55 | Ex. 56 | Ex. 57 | Ex. 58 | Ex. 59 | Ex. 60 |
|---|---|---|---|---|---|---|---|---|---|---|
| $SiO_2$ | 66.48 | 66.49 | 66.43 | 66.36 | 66.46 | 66.41 | 66.00 | 66.05 | 65.94 | 66.25 |
| $Al_2O_3$ | 12.10 | 12.22 | 12.18 | 12.11 | 12.11 | 12.11 | 12.06 | 12.09 | 12.04 | 12.19 |
| $B_2O_3$ | 7.05 | 7.00 | 7.07 | 7.12 | 7.08 | 7.10 | 7.24 | 7.33 | 7.37 | 7.25 |
| MgO | 3.87 | 3.72 | 3.48 | 3.50 | 3.77 | 3.46 | 3.78 | 3.52 | 3.85 | 3.40 |
| CaO | 6.37 | 6.47 | 6.84 | 6.91 | 6.43 | 6.88 | 7.01 | 7.11 | 6.90 | 7.06 |
| SrO | 4.03 | 4.01 | 3.90 | 3.89 | 4.03 | 3.94 | 3.80 | 3.80 | 3.80 | 3.76 |
| BaO | 0.00 | 0.00 | 0.00 | 0.00 | 0.00 | 0.00 | 0.00 | 0.00 | 0.00 | 0.00 |
| $SnO_2$ | 0.08 | 0.08 | 0.08 | 0.08 | 0.08 | 0.08 | 0.08 | 0.08 | 0.08 | 0.08 |
| $Fe_2O_3$ | 0.01 | 0.01 | 0.01 | 0.01 | 0.01 | 0.01 | 0.01 | 0.01 | 0.01 | 0.01 |
| $ZrO_2$ | 0.01 | 0.00 | 0.01 | 0.00 | 0.00 | 0.00 | 0.01 | 0.01 | 0.01 | 0.01 |
| $Na_2O$ | 0.00 | 0.00 | 0.00 | 0.00 | 0.00 | 0.00 | 0.00 | 0.00 | 0.00 | 0.00 |
| $K_2O$ | 0.01 | 0.01 | 0.01 | 0.01 | 0.01 | 0.01 | 0.01 | 0.01 | 0.01 | 0.01 |
| $TiO_2$ | 0.00 | 0.00 | 0.00 | 0.00 | 0.00 | 0.00 | 0.00 | 0.00 | 0.00 | 0.00 |
| $RO/Al_2O_3$ | 1.18 | 1.16 | 1.17 | 1.18 | 1.18 | 1.18 | 1.21 | 1.19 | 1.21 | 1.17 |
| $SO_2$ (ppm) | 157 | 156 | 152 | 151 | 157 | 153 | 148 | 148 | 148 | 146 |

| mol % | Ex. 61 | Ex. 62 | Ex. 63 | Ex. 64 | Ex. 65 | Ex. 66 | Ex. 67 | Ex. 68 | Ex. 69 | Ex. 70 |
|---|---|---|---|---|---|---|---|---|---|---|
| $SiO_2$ | 66.04 | 66.56 | 66.54 | 65.33 | 64.90 | 66.56 | 66.38 | 66.44 | 66.48 | 66.58 |
| $Al_2O_3$ | 12.73 | 12.43 | 12.47 | 12.59 | 12.96 | 12.34 | 12.18 | 12.25 | 12.13 | 12.12 |
| $B_2O_3$ | 7.04 | 7.02 | 6.89 | 6.98 | 7.00 | 7.02 | 6.70 | 6.73 | 7.00 | 6.67 |
| MgO | 3.23 | 3.32 | 4.24 | 4.96 | 4.07 | 4.36 | 4.14 | 4.01 | 3.88 | 4.22 |
| CaO | 7.33 | 7.44 | 6.36 | 5.39 | 6.78 | 6.19 | 6.52 | 6.56 | 6.55 | 6.37 |
| SrO | 3.53 | 3.12 | 3.39 | 4.65 | 4.18 | 3.42 | 3.93 | 3.88 | 3.82 | 3.90 |

TABLE-continued

| | | | | | | | | | | |
|---|---|---|---|---|---|---|---|---|---|---|
| BaO | 0.00 | 0.00 | 0.00 | 0.00 | 0.00 | 0.00 | 0.03 | 0.03 | 0.03 | 0.03 |
| $SnO_2$ | 0.09 | 0.08 | 0.09 | 0.08 | 0.09 | 0.08 | 0.08 | 0.08 | 0.08 | 0.08 |
| $Fe_2O_3$ | 0.01 | 0.01 | 0.01 | 0.01 | 0.01 | 0.01 | 0.01 | 0.01 | 0.01 | 0.01 |
| $ZrO_2$ | 0.01 | 0.01 | 0.01 | 0.01 | 0.01 | 0.01 | 0.00 | 0.00 | 0.00 | 0.00 |
| $Na_2O$ | 0.00 | 0.00 | 0.00 | 0.00 | 0.00 | 0.00 | 0.02 | 0.02 | 0.02 | 0.02 |
| $K_2O$ | 0.01 | 0.01 | 0.01 | 0.01 | 0.01 | 0.01 | 0.00 | 0.00 | 0.00 | 0.00 |
| $TiO_2$ | 0.00 | 0.00 | 0.00 | 0.00 | 0.00 | 0.00 | 0.00 | 0.00 | 0.00 | 0.00 |
| $RO/Al_2O_3$ | 1.11 | 1.12 | 1.12 | 1.19 | 1.16 | 1.13 | 1.20 | 1.18 | 1.18 | 1.20 |
| $SO_2$ (ppm) | 137 | 122 | 132 | 180 | 162 | 134 | 155 | 153 | 151 | 154 |

| mol % | Ex. 71 | Ex. 72 | Ex. 73 | Ex. 74 | Ex. 75 | Ex. 76 | Ex. 77 | Ex. 78 | Ex. 79 | Ex. 80 |
|---|---|---|---|---|---|---|---|---|---|---|
| $SiO_2$ | 66.47 | 66.38 | 66.36 | 66.13 | 66.56 | 66.38 | 66.35 | 66.35 | 66.65 | 66.51 |
| $Al_2O_3$ | 12.19 | 12.23 | 12.40 | 12.43 | 12.35 | 12.25 | 12.25 | 12.46 | 12.23 | 12.28 |
| $B_2O_3$ | 6.78 | 6.91 | 7.15 | 7.12 | 6.70 | 6.94 | 6.98 | 7.19 | 6.73 | 6.69 |
| MgO | 4.22 | 4.17 | 3.94 | 3.97 | 3.93 | 3.90 | 3.89 | 3.97 | 4.11 | 4.87 |
| CaO | 6.33 | 6.28 | 6.69 | 6.70 | 6.66 | 6.60 | 6.59 | 6.73 | 6.13 | 5.43 |
| SrO | 3.88 | 3.87 | 3.33 | 3.51 | 3.66 | 3.80 | 3.80 | 3.17 | 3.99 | 4.06 |
| BaO | 0.03 | 0.03 | 0.03 | 0.03 | 0.03 | 0.04 | 0.03 | 0.03 | 0.03 | 0.03 |
| $SnO_2$ | 0.08 | 0.08 | 0.08 | 0.07 | 0.08 | 0.08 | 0.08 | 0.08 | 0.08 | 0.08 |
| $Fe_2O_3$ | 0.01 | 0.01 | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 | 0.00 | 0.01 |
| $Na_2O$ | 0.02 | 0.03 | 0.01 | 0.02 | 0.02 | 0.01 | 0.01 | 0.01 | 0.01 | 0.02 |
| $K_2O$ | 0.00 | 0.00 | 0.01 | 0.01 | 0.01 | 0.01 | 0.01 | 0.01 | 0.01 | 0.01 |
| $TiO_2$ | 0.00 | 0.00 | 0.00 | 0.00 | 0.00 | 0.00 | 0.00 | 0.00 | 0.00 | 0.00 |
| $RO/Al_2O_3$ | 1.19 | 1.17 | 1.13 | 1.14 | 1.16 | 1.17 | 1.17 | 1.12 | 1.17 | 1.17 |
| $SO_2$ (ppm) | 153 | 153 | 131 | 138 | 144 | 150 | 150 | 125 | 157 | 160 |

| mol % | Ex. 81 | Ex. 82 | Ex. 83 | Ex. 84 | Ex. 85 | Ex. 86 | Ex. 87 | Ex. 88 | Ex. 89 | Ex. 90 |
|---|---|---|---|---|---|---|---|---|---|---|
| $SiO_2$ | 66.55 | 66.61 | 66.68 | 66.60 | 66.34 | 66.34 | 66.33 | 66.26 | 66.32 | 68.48 |
| $Al_2O_3$ | 12.45 | 12.29 | 12.35 | 12.35 | 12.34 | 12.33 | 12.33 | 12.55 | 12.54 | 12.38 |
| $B_2O_3$ | 6.79 | 6.61 | 6.45 | 6.60 | 6.67 | 7.26 | 7.05 | 7.10 | 7.27 | 6.18 |
| MgO | 3.37 | 3.77 | 3.30 | 3.38 | 2.97 | 3.47 | 3.70 | 3.48 | 3.47 | 2.55 |
| CaO | 7.55 | 6.80 | 7.55 | 7.26 | 9.26 | 7.95 | 7.94 | 7.95 | 7.96 | 7.88 |
| SrO | 3.15 | 3.76 | 3.52 | 3.67 | 2.28 | 2.52 | 2.52 | 2.52 | 2.31 | 2.39 |
| BaO | 0.03 | 0.03 | 0.03 | 0.03 | 0.00 | 0.00 | 0.00 | 0.00 | 0.00 | 0.00 |
| $SnO_2$ | 0.08 | 0.08 | 0.09 | 0.08 | 0.10 | 0.09 | 0.09 | 0.09 | 0.09 | 0.10 |
| $Fe_2O_3$ | 0.01 | 0.01 | 0.01 | 0.00 | 0.01 | 0.01 | 0.01 | 0.01 | 0.01 | 0.01 |
| $ZrO_2$ | 0.01 | 0.01 | 0.01 | 0.01 | 0.01 | 0.01 | 0.01 | 0.01 | 0.01 | 0.01 |
| $Na_2O$ | 0.01 | 0.01 | 0.01 | 0.01 | 0.00 | 0.00 | 0.00 | 0.00 | 0.00 | 0.00 |
| $K_2O$ | 0.01 | 0.01 | 0.01 | 0.01 | 0.01 | 0.01 | 0.01 | 0.01 | 0.01 | 0.01 |
| $TiO_2$ | 0.00 | 0.00 | 0.00 | 0.00 | 0.01 | 0.01 | 0.01 | 0.00 | 0.01 | 0.01 |
| $RO/Al_2O_3$ | 1.13 | 1.17 | 1.17 | 1.16 | 1.18 | 1.13 | 1.15 | 1.11 | 1.10 | 1.04 |
| $SO_2$ (ppm) | 124 | 148 | 139 | 145 | 90 | 99 | 99 | 99 | 91 | 94 |

According to an aspect of the present disclosure, at least in part due to use of relatively high-sulfur content in raw material, the as-analyzed sulfur content of glasses disclosed herein is a non-zero value measurable by XRF, such as greater than or equal to 5 ppm, such as greater than or equal to 10 ppm, such as greater than or equal to 20 ppm, such as greater than or equal to 25 ppm, such as greater than or equal to 30 ppm, such as greater than or equal to 40 ppm, such as greater than or equal to 50 ppm, and/or no more than as-batched amounts disclosed herein (because of outgassing), such as less than or equal to 300 ppm, such as less than or equal to 200 ppm, such as less than or equal to 100 ppm, such as less than or equal to 70 ppm.

Additionally, glasses of the Table, manufactured using conventional glass manufacturing processes and equipment with the additional process improvements disclosed herein, may be formed into large sheets without excessive amounts of blisters, as may have been previously associated without carefully controlling sulfur content for glasses used in high-performance displays in the past. Such blisters may be defined as gaseous bubbles or voids trapped in the solidified glass. The blisters may be elongate in shape, and have a longest cross-sectional linear dimension of at least 30 μm measured through a geometric centroid thereof, such as a major axis of such lengths. Trapped bubbles below such a size are excluded from consideration as "blisters" for purposes of the present disclosure because such microscopic bubbles may not matter for display purposes and/or such bubbles may be virtually imperceptible, if present at all.

According to an aspect of the present disclosure, sheets of glass, with the dimensions and compositions disclosed herein, have less than or equal to 10 blisters total per sheet, such as less than or equal to 5 blisters total per sheet, such as less than or equal to 2 blisters total per sheet, such as less than or equal to 1 blister total per sheet, such as no such blisters per sheet.

According to an aspect of the present disclosure, glass of the present disclosure may be arranged or formed as an article other than a sheet (e.g., fiber, sphere, rod), and may still have few if any blisters, as defined above, such as less than or equal to 10 blisters total per 15 cm³ of volume of the glass, such as less than or equal to 10 blisters total per 30 cm³, such as less than or equal to 10 blisters total per 50 cm³, such as less than or equal to 10 blisters total per 100 cm³, such as less than or equal to 10 blisters total per 500 cm$^3$. According to an aspect of the present disclosure, glass of the present disclosure may have less than or equal to 5 blisters total per 15 cm$^3$, such as less than or equal to 2 blisters total per 15 cm$^3$, such as less than or equal to 1 blister total per 15 cm$^3$, such as no such blisters for the full article. For glass articles as disclosed herein having less than 15 cm$^3$ of volume of glass, the articles may have less than or equal to 10, 5, 2, or even 1 blisters.

According to an aspect of the present disclosure, the different ranges of constituents on an oxide basis as-batch or as-analyzed may be combined as disclosed and shown in the Examples. However, certain exemplary combinations of such constituent ranges may be pointed to, such as silica greater than or equal to 64.9 mol % and less than or equal to 68.7 mol % with alumina greater than or equal to 11.5 mol % and less than or equal to 13.3 mol % with boria greater than or equal to 6.1 mol % and less than or equal to 7.2 mol % with magnesia greater than or equal to 2.5% and less than or equal to 5.6% with calcium oxide greater than or equal to 3.9% and less than or equal to 7.5% with strontia greater than or equal to 3.1% and less than or equal to 5.5%, where the strontia is from a lower-grade or "dirty" source raw material having greater than 200 ppm of oxides of sulfur (e.g., greater than 1000 ppm, greater than 1500 ppm, and/or greater than 3000 ppm; e.g., where the batch has more than 200 ppm thereof), with baria less than or equal to 0.1 mol % with total alkali metal oxides less than or equal to 0.1 mol %, and possibly including other constituents, such as optional or contaminate oxides disclosed herein in amounts disclosed herein. Another such combination of constituent ranges may be pointed to includes silica greater than or equal to 64 mol % and less than or equal to 69 mol % with alumina greater than or equal to 12 mol % and less than or equal to 13 mol % with boria greater than or equal to 6 mol % and less than or equal to 7.5 mol % with magnesia greater than or equal to 2% and less than or equal to 6% with calcium oxide greater than or equal to 3.5% and less than or equal to 8% with strontia greater than or equal to 3% and less than or equal to 6%, where the strontia is from a lower-grade or "dirty" source raw material having greater than 250 ppm of oxides of sulfur (e.g., greater than 1000 ppm, greater than 1500 ppm, and/or greater than 3000 ppm; e.g., where the batch has more than 200 ppm thereof), with baria less than or equal to 0.5 mol % with total alkali metal oxides less than or equal to 0.5 mol %, and possibly including other constituents, such as optional or contaminate oxides disclosed herein in amounts disclosed herein. For such pointed-to glasses, the corresponding as-analyzed, formed glass may have detectable sulfur content, as disclosed herein, such as at least 10 ppm (e.g., ≥15 ppm of the glass as analyzed, where ≥ includes > and/or =; ≥20 ppm; ≥25 ppm; ≥40 ppm) and may correspondingly be free of excess blisters, as just disclosed above herein, such as in part due to manufacturing process improvements as disclosed herein.

Construction and arrangements of the compositions, structures, assemblies, and structures, as shown in the various aspects, are illustrative only. Although only a few examples of the aspects have been described in detail in this disclosure, modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. For example, an aspect of the present disclosure includes a display device (see, e.g., FIG. 4 and corresponding text) with the glasses disclosed herein and/or a sheet (see, e.g., FIG. 3 and corresponding text) as disclosed herein. The order or sequence of any process, logical algorithm, or method steps may be varied or re-sequenced according to alternative embodiments. For example, according to an aspect of the present disclosure, glasses as disclosed herein may be made without additionally heating the crown of the furnace (see FIG. 2 and corresponding text) and may have correspondingly more blisters and/or sulfur content as analyzed. Other substitutions, modifications, changes and omissions may also be made in the design, operating conditions and arrangement of the various aspects without departing from the scope of the present inventive technology.

What is claimed is:

1. A sheet of glass for a high-performance display, the sheet comprising:
   a thickness greater than or equal to 200 μm and less than or equal to 2 mm;
   a width greater than or equal to 5 cm and less than or equal to 5 m;
   a height greater than or equal to 5 cm and less than or equal to 5 m; and
   a composition, as analyzed in mole percent on an oxide basis, comprising:
      64 to 69 mol % SiO$_2$;
      11 to 13 mol % Al$_2$O$_3$;
      6 to 7.5 mol % B$_2$O$_3$;
      2 to 6 mol % MgO;
      3 to 8 mol % CaO; and
      3 to 6 mol % SrO; and
   wherein the composition further comprises sulfur, and wherein the glass has a molar ratio (MgO+CaO+SrO)/ Al$_2$O$_3$ is from 0.95 to 1.3.

2. The sheet of claim 1, wherein the composition comprises greater than 10 ppm of sulfur.

3. The sheet of claim 1, wherein the composition comprises greater than 25 ppm of sulfur.

4. The sheet of claim 3, wherein the composition comprises less than 0.25 mol % of alkali metal oxides, in combination.

5. The sheet of claim 4, wherein the composition comprises less than 0.5 mol % of baria.

6. The glass of claim 1, wherein the molar ratio (MgO+ CaO+SrO)/Al$_2$O$_3$ is from 1.05 to 1.25.

7. The glass of claim 1, wherein the molar ratio (MgO+ CaO+SrO)/Al$_2$O$_3$ is from 1.1 to 1.24.

8. The glass of claim 1, wherein the glass comprises:
   6.1 to 7.1 mol % B$_2$O$_3$; and
   3.9 to 7.5 mol % CaO.

9. The glass of claim 1, wherein the glass comprises from greater than or equal to 50 ppm to less than or equal to 200 ppm sulfur.

10. The glass of claim 1, wherein the glass comprises from greater than or equal to 25 ppm to less than or equal to 70 ppm sulfur.

11. The glass of claim 1, wherein the glass comprises less than or equal to 0.5 mol % BaO.

12. The glass of claim 1, wherein the glass comprises:
   11.51 to 13 mol % Al$_2$O$_3$;
   6.1 to 7.2 mol % B$_2$O$_3$; and
   3 to 5.5 mol % SrO.

13. A glass, as analyzed in mole percent on an oxide basis, comprising:
   64 to 69 mol % SiO$_2$;
   11 to 13 mol % Al$_2$O$_3$;
   6 to 7.5 mol % B$_2$O$_3$;
   2 to 6 mol % MgO;

3 to 8 mol % CaO; and 3 to 6 mol % SrO;

wherein the glass further comprises sulfur, and wherein the glass has a molar ratio $(MgO+CaO+SrO)/Al_2O_3$ is from 0.95 to 1.3.

14. The glass of claim 13, wherein the glass comprises >25 ppm of sulfur.

15. The glass of claim 14, wherein the glass comprises less than 0.25 mol % of alkali metal oxides, in combination, and less than 0.5 mol % of baria.

16. The glass of claim 13, wherein the molar ratio $(MgO+CaO+SrO)/Al_2O_3$ is from 1.05 to 1.25.

17. The glass of claim 13, wherein the molar ratio $(MgO+CaO+SrO)/Al_2O_3$ is from 1.1 to 1.24.

18. The glass of claim 13, wherein the glass comprises:

6.1 to 7.1 mol % $B_2O_3$; and 3.9 to 7.5 mol % CaO.

19. The glass of claim 13, wherein the glass comprises from greater than or equal to 50 ppm to less than or equal to 200 ppm sulfur.

20. The glass of claim 13, wherein the glass comprises from greater than or equal to 25 ppm to less than or equal to 70 ppm sulfur.

\* \* \* \* \*